(12) United States Patent
Park

(10) Patent No.: US 9,100,442 B2
(45) Date of Patent: Aug. 4, 2015

(54) IMAGE FORMING APPARATUS SUPPORTING PEER-TO-PEER CONNECTION AND METHOD OF MANAGING ADDRESS BOOK THEREOF

(75) Inventor: Hyun-wook Park, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 111 days.

(21) Appl. No.: 13/595,133

(22) Filed: Aug. 27, 2012

(65) Prior Publication Data

US 2013/0057908 A1 Mar. 7, 2013

(30) Foreign Application Priority Data

Sep. 2, 2011 (KR) .................... 10-2011-0089249

(51) Int. Cl.
*G06F 3/12* (2006.01)
*H04L 29/12* (2006.01)

(52) U.S. Cl.
CPC .......... *H04L 61/2015* (2013.01); *G06F 3/1203* (2013.01); *G06F 3/1236* (2013.01); *G06F 3/1292* (2013.01)

(58) Field of Classification Search
None
See application file for complete search history.

(56) References Cited

U.S. PATENT DOCUMENTS

| 7,257,374 | B1 | 8/2007 | Creigh |
|---|---|---|---|
| 2003/0156567 | A1* | 8/2003 | Oak ............................. 370/338 |
| 2005/0078337 | A1 | 4/2005 | Ichikawa et al. |
| 2008/0052710 | A1 | 2/2008 | Iwai et al. |
| 2008/0137121 | A1 | 6/2008 | Chrisop et al. |
| 2010/0014111 | A1 | 1/2010 | Konno |
| 2010/0069008 | A1* | 3/2010 | Oshima et al. ............... 455/41.3 |
| 2011/0026504 | A1 | 2/2011 | Feinberg |
| 2011/0082940 | A1* | 4/2011 | Montemurro et al. ........ 709/227 |
| 2011/0085529 | A1 | 4/2011 | Choi et al. |
| 2011/0294502 | A1* | 12/2011 | Oerton ....................... 455/426.1 |
| 2013/0057912 | A1* | 3/2013 | Park ............................. 358/1.15 |
| 2013/0128311 | A1* | 5/2013 | Kim et al. .................... 358/1.15 |
| 2013/0148161 | A1* | 6/2013 | Park et al. .................... 358/1.15 |

FOREIGN PATENT DOCUMENTS

| EP | 2410512 | 1/2012 |
|---|---|---|
| JP | 2006-163793 | 6/2006 |

(Continued)

OTHER PUBLICATIONS

Extended European Search Report dated Dec. 6, 2012, from European Patent Application No. 12182400.7.

(Continued)

*Primary Examiner* — Miya J Cato
(74) *Attorney, Agent, or Firm* — Staas & Halsey LLP

(57) ABSTRACT

A method of managing an address book of an image forming apparatus that supports a peer-to-peer (P2P) connection includes connecting the image forming apparatus to an external wireless device in the P2P connection method through a wireless local area network (WLAN); operating a soft access point (AP) module of the image forming apparatus so that the image forming apparatus operates as an AP; allocating an internet protocol (IP) address to the wireless device by driving a dynamic host configuration protocol (DHCP) server unit (DHCP server) of the image forming apparatus; and registering the wireless device connected to the image forming apparatus in the address book, which stores wireless devices that are connectable to the image forming apparatus, with the allocated IP address.

21 Claims, 11 Drawing Sheets

(56) References Cited

FOREIGN PATENT DOCUMENTS

| JP | 2006-333247 | 12/2006 |
|---|---|---|
| JP | 2010-178054 | 8/2010 |
| WO | WO 02/41107 | 5/2002 |
| WO | WO 2008/144520 | 11/2008 |

OTHER PUBLICATIONS

Extended European Search Report dated Dec. 6, 2012, from European Patent Application No. 12182398.3.

Extended European Search Report dated Dec. 6, 2012, from European Patent Application No. 12182412.2.

Extended European Search Report dated Dec. 10, 2012, from European Patent Application No. 12182405.6.

Extended European Search Report dated Dec. 13, 2012, from European Patent Application No. 12182403.1.

PCT Notification of Transmittal of the International Search Report and the Written Opinion of the International Searching Authority or the Declaration, mailed Jan. 31, 2013, from PCT Patent Application No. PCT/KR2012/006976.

"Dynamic Host Configuration Protocol", Wikipedia, Edited Aug. 30, 2011 (12 pages).

"Wi-Fi Certified Wi-Fi Direct," Wi-Fi Alliance, Oct. 2010 (English version, 6 pages, Korean version 8 pages).

Wi-Fi Alliance, "Wi-Fi Direct", Retrieved Mar. 18, 2015, URL <http://www.wi-fi.org/Wi-Fi_Direct.php)>.

* cited by examiner

IMAGE FORMING APPARATUS SUPPORTING PEER-TO-PEER CONNECTION AND METHOD OF MANAGING ADDRESS BOOK THEREOF

CROSS-REFERENCE TO RELATED APPLICATIONS

This application claims the priority benefit of Korean Patent Application No. 10-2011-0089249, filed on Sep. 2, 2011, in the Korean Intellectual Property Office, the disclosure of which is incorporated herein in its entirety by reference.

BACKGROUND

1. Field

Embodiments relate to an image forming apparatus supporting peer to peer (P2P) connection, and more particularly, to a method of registering a wireless device connecting to an image forming apparatus that supports P2P connection in an address book of the image forming apparatus, and managing the address book.

2. Description of the Related Art

Recently, peer to peer (P2P) communication technology, by which wireless devices may be directly connected to each other without an additional wireless connecting apparatus, have been generalized and widely used. For example, Bluetooth technology makes the P2P communication possible. Although there are limitations in terms of transmission speed and transmission range of Bluetooth, new versions of Bluetooth are being developed to compensate for the limitations.

In addition, Wi-Fi, which is a wireless local area network (WLAN) standard based on IEEE 802.11 regulated by the Wi-Fi alliance is basically a technology using ultra-high speed Internet by accessing access points (APs) connected to an infrastructure network; however, the Wi-Fi may serve the P2P communication by using an ad-hoc function. However, when the ad-hoc function is used, security is weakened, a transmission speed is lowered, and a setting method is not easily performed. Therefore, the Wi-Fi alliance has suggested a Wi-Fi Direct technology that makes the P2P communication possible. The Wi-Fi Direct allows P2P connection between wireless devices without using the AP, supports a transmission speed of a maximum of 250 Mbps, and performs security settings by using Wi-Fi protected access 2 (WPA2), in order to address problems of the ad-hoc function. In addition, the Wi-Fi Direct supports a transmission range of a maximum of 200 m, and thus, is considered as a substitute for the P2P communication.

As described above, with the appearance of the Wi-Fi Direct, it is considered that utilization of the P2P communication is increased more. In addition, the P2P communication technology may be also applied to image forming apparatuses such as printers, scanners, facsimiles, and multi-function printers. Therefore, technologies for user authentication, controlling connections, controlling rights, and managing security are necessary for safely and conveniently using image forming apparatuses supporting the P2P connection.

SUMMARY

According to one or more embodiments, there is provided a method of automatically registering and managing a wireless device connected to an image forming apparatus, which supports a peer-to-peer (P2P) connection, in an address book of the image forming apparatus.

According to an aspect of one or more embodiments, there is provided a method of managing an address book of an image forming apparatus that supports a peer to peer (P2P) connection, the method including: connecting the image forming apparatus to an external wireless device in a P2P connection method through a wireless local area network (WLAN); operating a soft access point (AP) module of the image forming apparatus so that the image forming apparatus operates as an AP; allocating an internet protocol (IP) address to the wireless device by driving a dynamic host configuration protocol (DHCP) server module of the image forming apparatus; and registering the wireless device connected to the image forming apparatus in the address book, which stores information about wireless devices that may be connectable to the image forming apparatus, along with the allocated IP address.

The image forming apparatus may function as the AP that allows clients on a WLAN to be connected to each other or may function as a client on the WLAN, and the allocating of the IP address may be performed when the image forming apparatus functions as the AP.

The registering of the wireless device in the address book may include: receiving device information of the connected wireless device; and generating an address name, in which the wireless device is registered, by using the device information.

The method may further include: determining whether the connection between the wireless device and the image forming apparatus is maintained; and updating the address book when it is determined that the wireless device is disconnected.

The method may further include: scanning a network port of the wireless device; determining a protocol supported by the wireless device as a result of the scanning; and activating the protocol supported by the wireless device in the address book.

According to one or more embodiments, there is provided an image forming apparatus supporting a peer to peer (P2P) connection, the image forming apparatus including: a communication interface unit connecting to an external wireless device in a P2P connection method when the image forming apparatus performs as an access point (AP) by driving a soft AP module; a communication control unit allocating an internet protocol (IP) address to the wireless device connected to the image forming apparatus through the communication interface unit, by driving a dynamic host configuration protocol (DHCP) server module; an address book management unit registering the wireless device connected to the image forming apparatus in an address book, in which wireless devices that may be connectable to the image forming apparatus are registered, along with the allocated IP address; and an address book storage unit storing the address book.

The image forming apparatus may function as the AP that allows clients on a wireless local area network (WLAN) to be connected to each other or may function as a client on the WLAN, and the communication control unit may allocate the IP address to the wireless device when the image forming apparatus functions as the AP.

The communication control unit may receive device information of the wireless device connected to the image forming apparatus to transmit the device information to the address book management unit, and the address book management unit may generate an address book, in which the wireless device is registered, by using the device information.

When the wireless device and the image forming apparatus are disconnected, the communication control unit may notify the address book management unit of the disconnection, and the address book management unit may update the address book stored in the address book storage unit.

The address book management unit may scan of a network port of the wireless device to search for a protocol supported by the wireless device, and may activate the searched protocol.

According to an aspect of one or more embodiments, there is provided at least one non-transitory computer readable medium storing computer readable instructions to implement one or more methods of embodiments.

BRIEF DESCRIPTION OF THE DRAWINGS

The above and other features and advantages will become more apparent by describing in detail embodiments thereof with reference to the attached drawings in which.

DETAILED DESCRIPTION

Embodiments will be described more fully hereinafter with reference to the accompanying drawings, in which illustrative embodiments are shown. However, embodiments may be embodied in many different forms and should not be construed as limited to embodiments set forth herein; rather, these embodiments are provided so that this disclosure will be thorough and complete, and will fully convey the scope of the disclosure to those of ordinary skill in the art. Like numbers refer to like elements throughout.

Hereinafter, a multi-function printer (MFP) that supports Wi-Fi Direct will be described as an example of an image forming apparatus supporting a peer-to-peer (P2P) connection. However, the scope of one or more embodiments to be protected is not limited thereto.

Before describing one or more embodiments, basic connections and operations of an MFP that supports the Wi-Fi Direct will be described with reference to accompanying drawings.

Figure 1:
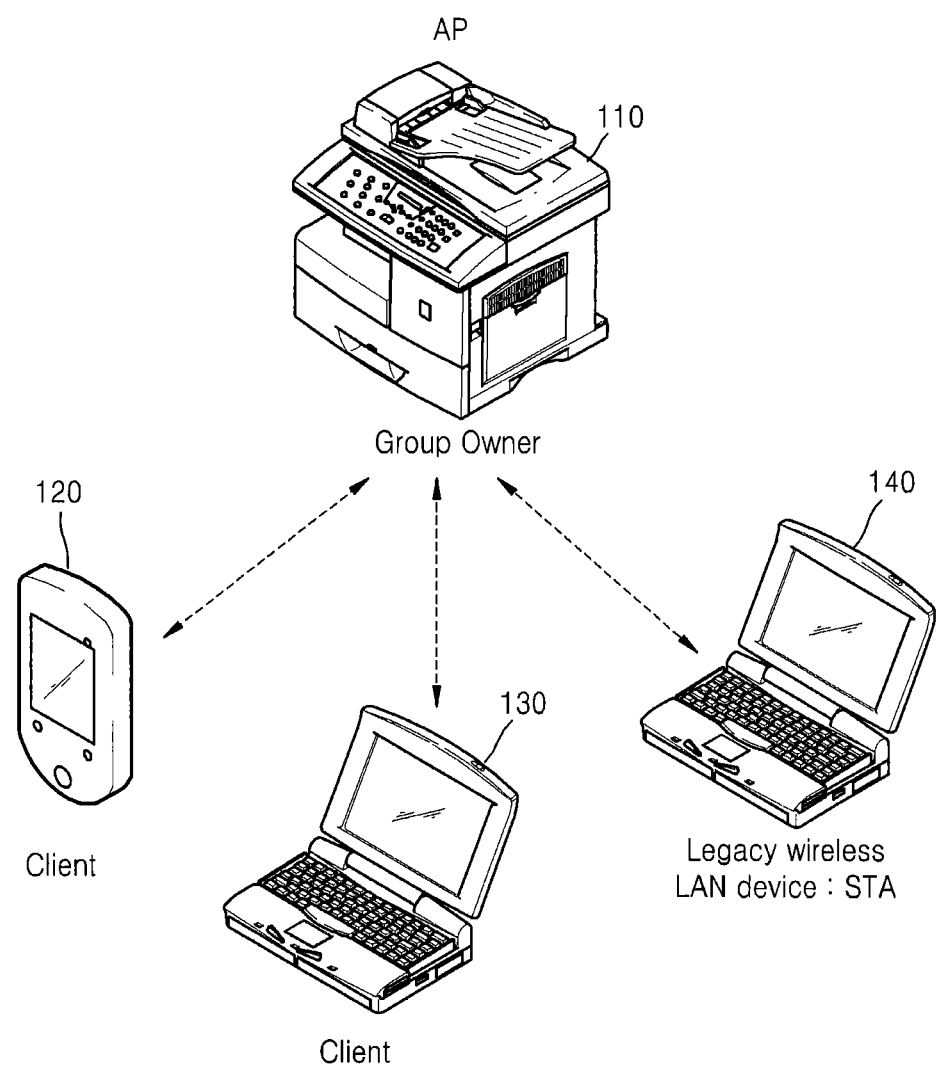
FIG. 1 is a diagram showing devices supporting Wi-Fi Direct and legacy wireless local area network (WLAN) devices that are wirelessly connected to each other to form a wireless network.

FIG. 1 is a diagram showing wireless local area network (WLAN) devices supporting Wi-Fi Direct and a legacy WLAN device connecting to each other to form a wireless network. Referring to FIG. 1, an MFP 110 supporting the Wi-Fi Direct is wirelessly connected to a smartphone 120 supporting the Wi-Fi Direct, a laptop computer 130 supporting the Wi-Fi Direct, and a legacy WLAN laptop computer 140. Here, the legacy WLAN laptop computer 140 denotes a conventional laptop computer which adopts a WLAN technology and does not support the Wi-Fi Direct.

The WLAN device supporting the Wi-Fi Direct (hereinafter, referred to as "Wi-Fi Direct device") may perform a P2P connection without using an infrastructured network, unlike conventional devices supporting Wi-Fi. In more detail, according to the conventional Wi-Fi technology, a Wi-Fi device is wirelessly connected to a router, that is, an access point (AP), connected to an infrastructured network that is configured in advance in order to form a wireless network. Here, the Wi-Fi devices, which are wirelessly connected to the AP, function as stations. However, according to Wi-Fi Direct technology, one of the Wi-Fi Direct devices that are to form the wireless network operates as an AP, and the other Wi-Fi Direct devices are wirelessly connected to the Wi-Fi Direct device that operates as the AP to operate as stations. Therefore, the wireless network may be formed between the Wi-Fi direct devices without the AP connected to the infrastructured network. In addition, when the wireless network is formed between the Wi-Fi direct devices, the legacy WLAN devices such as the Wi-Fi devices may recognize the Wi-Fi direct device operates as the AP as an AP and may be wirelessly connected to the Wi-Fi direct device.

Referring to FIG. 1, the Wi-Fi Direct MFP 110, the Wi-Fi Direct smartphone 120, and the Wi-Fi Direct laptop computer 130 that are the Wi-Fi direct devices form a wireless network without an AP connected to the infrastructured network. As described above, the Wi-Fi direct devices may be wirelessly connected to each other to form a P2P group without an AP connected to the infrastructured network. Here, the Wi-Fi Direct MFP 110 operates as the AP, and the device operating as the AP among the Wi-Fi direct devices is referred to as a group owner (GO) of a P2P group. In addition, the Wi-Fi smartphone 120 and the Wi-Fi Direct laptop computer 130 are wirelessly connected to the GO, that is, the Wi-Fi Direct MFP 110, to operate as the stations, which are referred to as clients. On the other hand, the legacy WLAN laptop computer 140 that does not support the Wi-Fi Direct recognizes the GO, that is, the Wi-Fi Direct MFP 110, as the AP, and is wirelessly connected to the GO to be connected to the wireless network formed by the Wi-Fi direct devices.

In FIG. 1, the Wi-Fi Direct MFP 110 operates as the GO; however, any one of the other Wi-Fi direct devices, that is, the smartphone 120 and the laptop computer 130, may operate as the GO and the MFP 110 may operate as the client. Which of the Wi-Fi direct devices to become the GO is determined through a negotiation process in Wi-Fi direct connection processes, and this will be described in detail later. In addition, the Wi-Fi direct device may be the GO by itself before the connection without any negotiation, and the Wi-Fi direct device in this case is referred to as an autonomous group owner (AGO). In addition, a wireless network formed based on the AGO is referred to as an autonomous P2P group. When the autonomous P2P group is formed, the legacy WLAN device may recognize the AGO as an AP connected to the infrastructured network and may be connected to the AGO.

Although FIG. 1 shows an example in which the Wi-Fi direct devices form the P2P group without the AP connected to the infrastructured network, the Wi-Fi direct devices may operate as the stations by connecting to the AP, if the AP is connected to the infrastructured network.

Hereinafter, wireless connecting processes between the Wi-Fi direct devices and characteristics of the Wi-Fi Direct technology will be described with reference to the accompanying drawings. For convenience of description, an MFP supporting the Wi-Fi Direct (hereinafter, referred to as "Wi-Fi Direct MFP") will be described as an example; however, the scope of one or more embodiments is not limited thereto, that is, one or more embodiments may be applied to printers, scanners, or facsimiles supporting the Wi-Fi Direct. In addition, the Wi-Fi Direct is used as an example of the P2P communication method; however, other kinds of P2P communication such as Bluetooth and Zigbee may be used.

Figure 2:
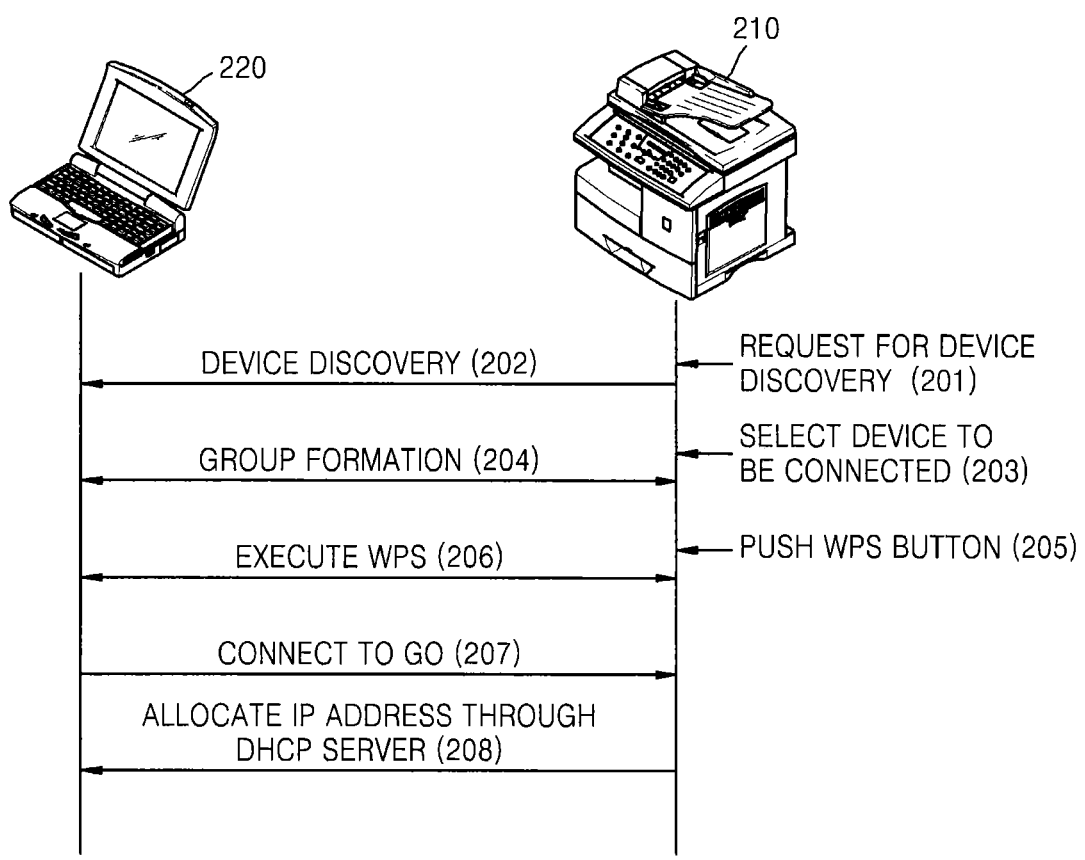
FIG. 2 is a diagram showing processes of wirelessly connecting the devices supporting the Wi-Fi Direct to each other.

FIG. 2 is a diagram showing processes of wirelessly connecting Wi-Fi Direct devices to each other. In more detail, processes of Wi-Fi Direct connection between a Wi-Fi Direct MFP 210 and a Wi-Fi Direct laptop computer 220 are shown. The Wi-Fi Direct connecting processes may be divided as a device discovery process, a group formation process, and a secure connection process. Referring to FIG. 2, the Wi-Fi Direct MFP 210 receives a request for device discovery from a user (201), and searches for a Wi-Fi Direct device around it (202). The device discovery request may be input through a user interface of the MFP 210, for example, a user interface realized on a display unit such as a liquid crystal display (LCD) formed in the MFP 210. If it is determined as a result of searching that there is a Wi-Fi Direct device around the MFP 210, the MFP 210 shows the user the searched device through the display unit and receives a connection request 203 from the user. The connection request 203 may be also input through the display unit of the MFP 210 from the user, for example, the user may push buttons or a touch panel of the display unit. If there is a plurality of Wi-Fi Direct devices, the MFP 210 displays a list of the searched Wi-Fi direct devices on the display unit so that the user may select one of the Wi-Fi direct devices and request the connection to the selected Wi-Fi direct device.

After receiving the connection request 203, a group formation is performed between the Wi-Fi Direct devices to be connected (204). The group formation process determines the Wi-Fi Direct devices to be connected to each other and determines the Wi-Fi direct devices to be the GO or the clients in the group. The Wi-Fi Direct device to be the GO is determined through the negotiation between the Wi-Fi Direct devices, and the negotiation will be described in detail with reference to FIG. 4.

When the group is formed, the devices included in the group are to be securely connected to each other by using a Wi-Fi protected setup (WPS) technology. The WPS denotes a function of performing simple secure connection between the Wi-Fi supporting devices. The WPS may be classified as a personal identification number (PIN) type WPS and a push button configuration (PBC) type WPS. The PIN type WPS sets the secure connection by inputting a PIN code that is set in advance, and the PBC type WPS sets the secure connection by pushing a WPS button that is provided on the Wi-Fi Direct device.

Hereinafter, the PBC type WPS will be described as an example. The user pushes a WPS button provided on the MFP 210 to request the secure connection (205). In addition, within a predetermined period of time (in general, 120 seconds), the secure connection may be achieved by pushing a WPS button formed on the laptop computer 220, or a WPS button realized on an application program for Wi-Fi Direct connection in the laptop computer 220. The WPS button realized on the application program for the Wi-Fi Direct connection in the laptop computer 220 may be an object represented on a display unit of the laptop computer 220 by the application program for the Wi-Fi Direct connection. A detailed example of the WPS button is represented as reference numeral 510 in FIG. 5. The user clicks the WPS button represented on the display unit of the laptop computer 220 by using a mouse, for example, to request the secure connection. When the security connection is requested by pushing the WPS button, the device that is determined to be the GO in the group formation process transmits security information to devices determined as the clients (206). According to the Wi-Fi Direct, the secure connection is executed after encrypting in a Wi-Fi protected access 2 (WPA2)-pre-shared key (PSK) method, and thus, the Wi-Fi Direct may have a higher security function than that of a conventional wired equivalent privacy (WEP) or Wi-Fi protected access (WAP) method.

When the WPS is executed, the Wi-Fi direct device that is the client is connected to the Wi-Fi direct device that is the GO (207). At this time, the Wi-Fi Direct device that is the GO automatically allocates an Internet protocol (IP) address to the Wi-Fi direct device that is the client by using a dynamic host configuration protocol (DHCP) server (208), and then, the P2P connection between the Wi-Fi Direct devices is completed.

Basic processes for connecting the Wi-Fi direct devices have been described so far, and detailed processes and characteristics of the Wi-Fi Direct technology will be described with reference to the accompanying drawings as follows.

Figure 3:
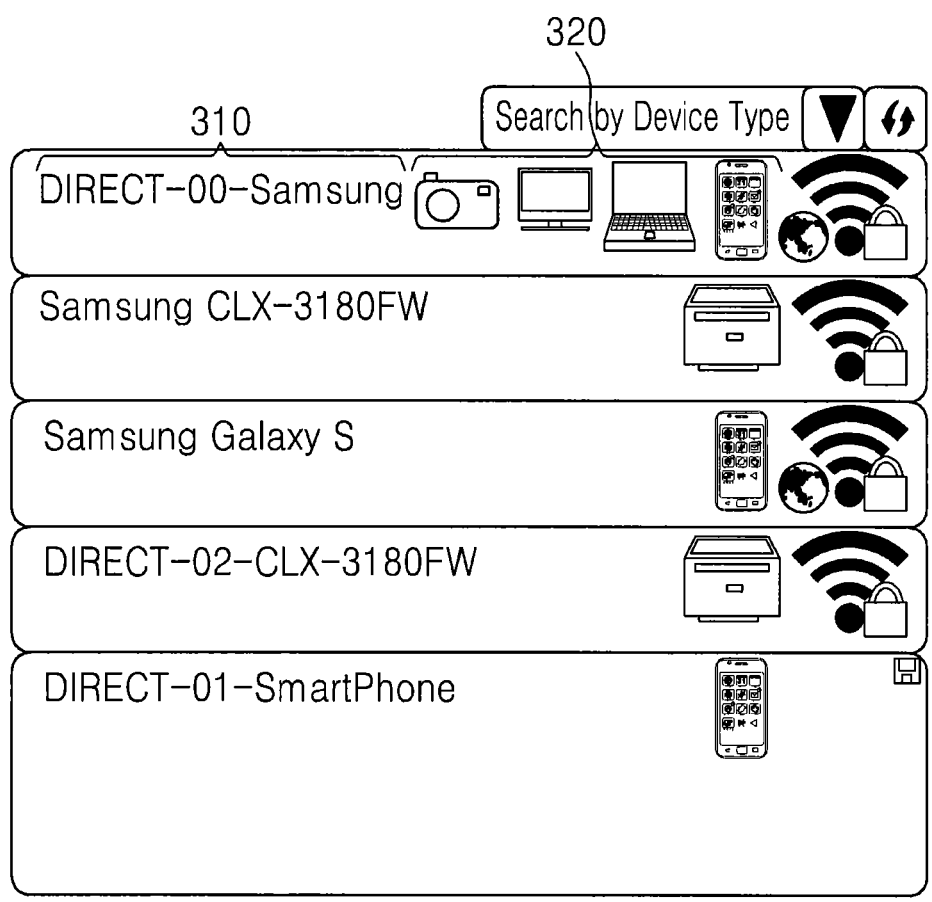
FIG. 3 is a diagram showing an example of displaying a list of Wi-Fi Direct devices that are found after a device discovery process performed by a device supporting the Wi-Fi Direct.

FIG. 3 is a diagram showing an example of displaying a list of the Wi-Fi Direct devices that are searched in the device discovery process in the Wi-Fi Direct device. When the device discovery process is performed by the Wi-Fi direct device, device information such as a type of the device and a service set identifier (SSID) of the device is exchanged between the devices through a probe request and a probe response that are WLAN packets, and the Wi-Fi direct device that performs the device discovery process displays the collected information. As shown in FIG. 3, the SSIDs and the types of the searched Wi-Fi Direct devices are represented as text 310 or icons 320. Here, all of the searched devices may be represented in the list; however, the devices may be filtered so that the devices of a desired type may be only displayed in the list. According to the Wi-Fi Direct technology, the Wi-Fi direct devices are defined in category units. The Wi-Fi Direct devices may be classified as categories, for example, computers, input devices, printers, scanners, facsimiles, copying machines, and cameras, and each of the categories is divided into sub-categories. For example, the computer may be classified as personal computers (PCs), servers, laptop computers, and the like.

Figure 4:
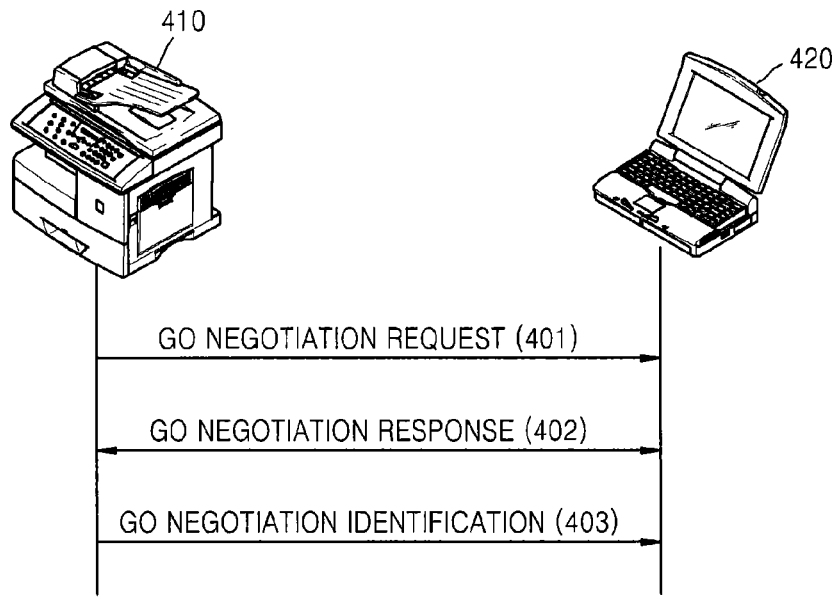
FIG. 4 is a diagram showing a group formation process in the processes of connecting the Wi-Fi Direct supporting devices to each other.

FIG. 4 is a diagram showing the group formation process in detail among the connecting processes between the Wi-Fi Direct devices. The group formation process is a process for determining the Wi-Fi Direct devices that are to form a network, and the Wi-Fi Direct devices to be the group owner (GO) and the clients. For example, when the Wi-Fi direct MFP 410 performs the device discovery and selects a laptop computer 420 among the discovered Wi-Fi Direct devices to be connected, the MFP 410 transmits a GO negotiation request to the laptop computer 420 (401). The laptop computer 420 receiving the GO negotiation request compares an intent value thereof with that of the MFP 410, and then, determines the MFP 410 as the GO when the intent value of the MFP 410 is greater than that of the laptop computer 420 and determines the laptop computer 420 as the GO when the intent value of the laptop computer 420 is greater. Here, the intent value is a value representing a degree of task intent in each device, and is determined by manufacturer policy and user settings. The intent value of the device, which is supplied power always, may be set to be relatively high. As described above, after determining the Wi-Fi Direct device to be the GO by comparing the intent values, the laptop computer 420 transmits the determination result to the MFP 410 as a response to the GO negotiation (402). The MFP 410 that receives the determination result transmits an acknowledgement to the laptop computer 420 (403) in order to verify the receipt of the negotiation, and then, the group formation process is finished. When the group formation is completed, the Wi-Fi Direct device that is the GO manages security information and SSIDs of the other Wi-Fi Direct devices included in the group.

Figure 5:
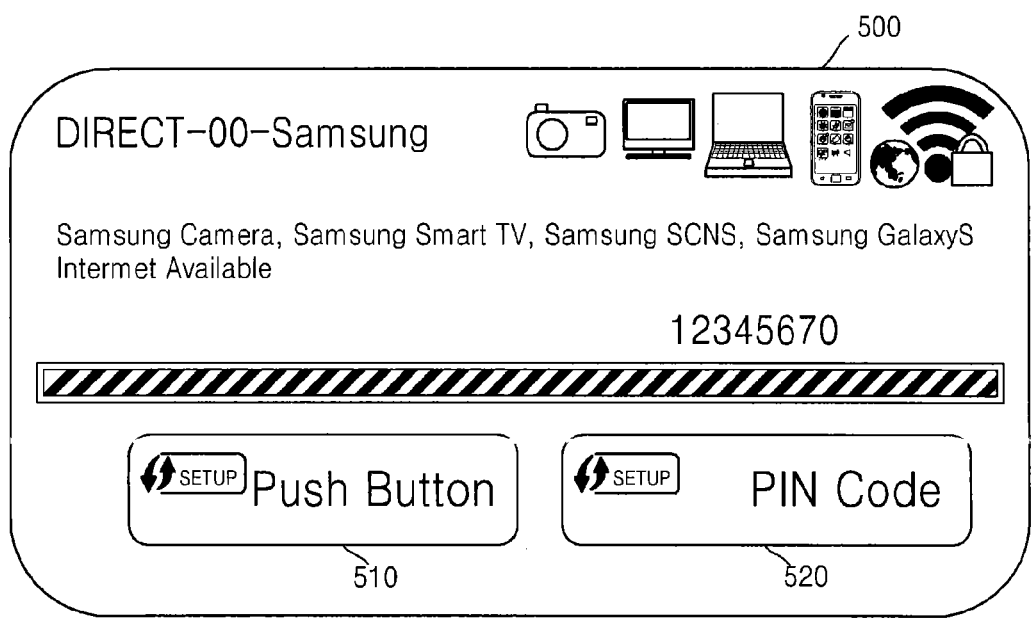
FIG. 5 is a diagram showing a display screen for executing WPS.

When the group is formed, the Wi-Fi Direct devices included in the group are securely connected to each other through the WPS. FIG. 5 is a diagram showing a display screen 500 for executing the WPS. The screen of FIG. 5 may be displayed on a display unit of the Wi-Fi Direct MFP. Referring to FIG. 5, the user may select one of a WPS button 510 and a PIN code 520 for executing the WPS. When the WPS is executed through the WPS button 510, the WPS button 510 of the Wi-Fi Direct MFP is pushed and WPS buttons of other devices are pushed within a predetermined period of time, and then, security information is exchanged between the devices automatically and the secure connection is made. Here, the Wi-Fi Direct device that is the GO provides security information to the Wi-Fi direct devices that are the clients. In addition, the secure connection is performed after encrypting in the WPA2-PSK verification method, and thus, high security may be achieved.

Figure 6:
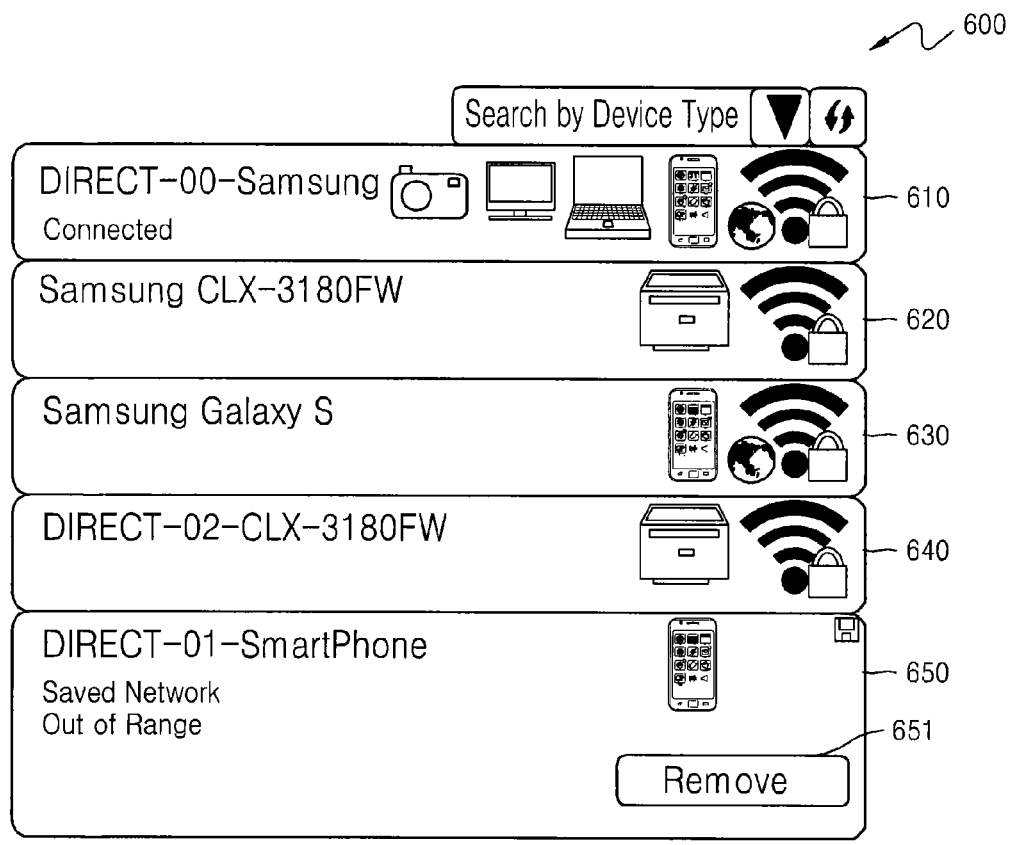
FIG. 6 is a diagram showing a list of devices supporting Wi-Fi Direct, information of which is stored according to a profile storing function.

The Wi-Fi Direct devices have a profile storage function that is for storing information of the Wi-Fi Direct devices connected once thereto. FIG. 6 is a diagram showing a list of the Wi-Fi Direct devices, information of which is stored according to the profile storage function. The list of FIG. 6 is a screen displayed on the display unit of the Wi-Fi Direct MFP. Information of a first list 610 denotes a Wi-Fi Direct device currently connected to the Wi-Fi Direct MFP, information of second through fourth lists 620-640 denotes Wi-Fi Direct devices that are not currently connected to the Wi-Fi Direct MFP, but are included in a device discovery range of the Wi-Fi Direct MFP, and information of a fifth list 650 denotes a Wi-Fi Direct device that has been connected at least once to the Wi-Fi Direct device although that is not discovered currently. If the information of the fifth list 650 is not necessary, the user may delete the fifth list 650 by pushing a remove button 651. Since the Wi-Fi direct device has the profile storage function as described above, the Wi-Fi Direct device stores information of the other Wi-Fi Direct devices connected at least once thereto, and then, may be connected fast without executing the WPS by using the stored information in a case where the same device tries to connect thereto again.

Figure 7:
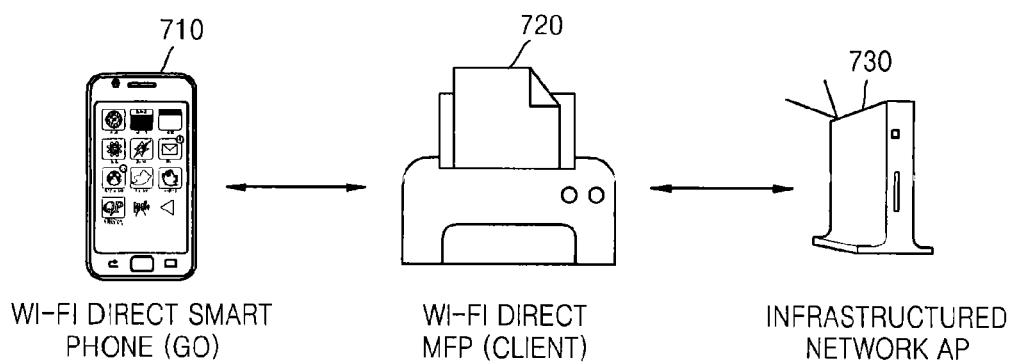
FIG. 7 is a diagram showing Wi-Fi Direct supporting devices that are simultaneously connected to each other.

The Wi-Fi Direct device may be P2P connected to another Wi-Fi direct device, and at the same time, may be connected to the infrastructured network, which is referred to as a concurrent connection. FIG. 7 is a diagram showing the Wi-Fi Direct devices that are in the concurrent connection states. Referring to FIG. 7, the Wi-Fi direct MFP 720 is P2P connected to a smartphone 710 that is another Wi-Fi direct device, and at the same time, the Wi-Fi Direct MFP 720 is also connected to an AP 730 of the infrastructured network. The Wi-Fi Direct MFP 720 may directly transmit/receive print data to/from the smartphone 710, and at the same time, may directly transmit/receive print data to/from the infrastructured network through the AP 730 of the infrastructured network.

When the Wi-Fi direct device is concurrently connected to the Wi-Fi Direct device and the infrastructured network as shown in FIG. 7, or when the Wi-Fi Direct device is wired connected to the infrastructured network and P2P connected to another Wi-Fi direct device, different IP addresses and MAC addresses with respect to the connections, that is, the connection to the infrastructured network and the connection to the another Wi-Fi Direct device, may be used. Through a multi-homing technology, the Wi-Fi Direct device may provide the devices with different services from each other. For example, the Wi-Fi Direct MFP may provide services of all functions of the MFP through an interface connected to the infrastructured network; however, the Wi-Fi Direct MFP may provide services of partial functions of the MFP through an interface connected to another Wi-Fi Direct device.

Figure 8:
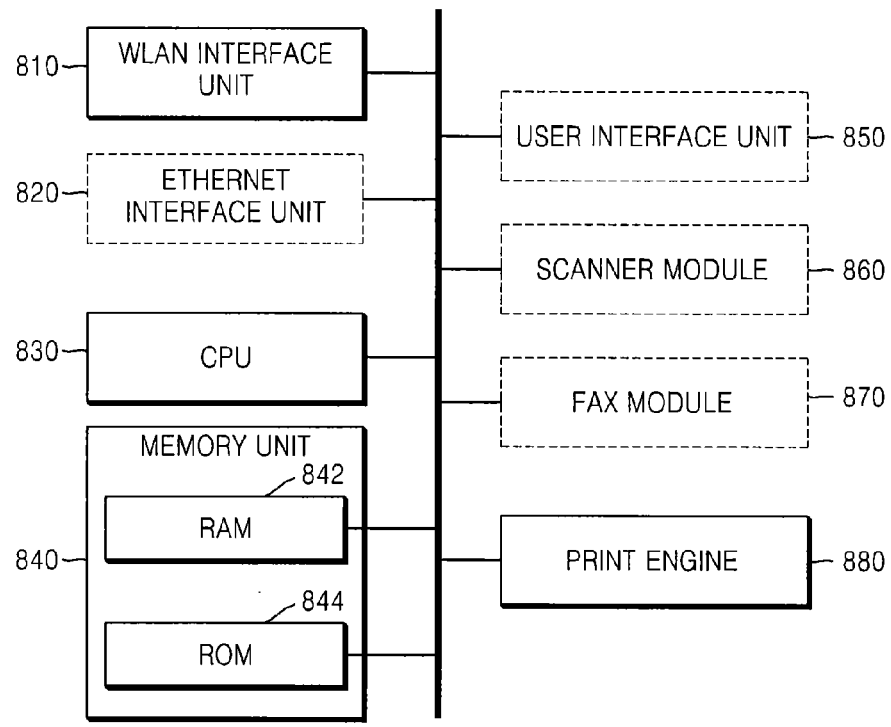
FIG. 8 is a block diagram showing a hardware configuration of a multi-function printer supporting the Wi-Fi Direct according to an embodiment.

FIG. 8 is a block diagram showing a hardware configuration of the Wi-Fi Direct MFP. Referring to FIG. 8, the Wi-Fi Direct MFP may include a WLAN interface module 810, an Ethernet interface module 820, a central processing unit (CPU) 830, a memory unit 840, a user interface module 850, a scanner module 860, a fax module 870, and a print engine 880. In addition, the memory unit 840 may include a random access memory (RAM) 842 and a read only memory (ROM) 844. If the MFP only supports the WLAN, the MFP may not include the Ethernet interface module 820. In addition, if the device is a printer, rather than the MFP, the scanner module 860 and the fax module 870 are not necessary.

The WLAN interface module 810 is hardware performing IEEE 802.11 b/g/n function, and may communicate with a main board, on which the CPU 830 is mounted, of the MFP via a universal serial bus (USB). The Ethernet interface module 820 is hardware for performing wired Ethernet communication according to IEEE 802.3. The CPU 830 controls overall operations of the MFP, and the memory unit 840 stores information for controlling the MFP and the print data to be read when it is necessary. The user interface module 850 functions as a medium for the user to identify information of the MFP and to input commands into the MFP. The user interface module 850 may be variously modified according to products, for example, may be configured as two or four lines displayed on a display unit such as an LCD or a light emitting diode (LED), or may be realized as a graphic user interface (UI) so as to represent various graphics. The scanner module 860, the fax module 870, and the print engine 880 are hardware for performing functions of a scanner, a facsimile, and a printer.

Figure 9:
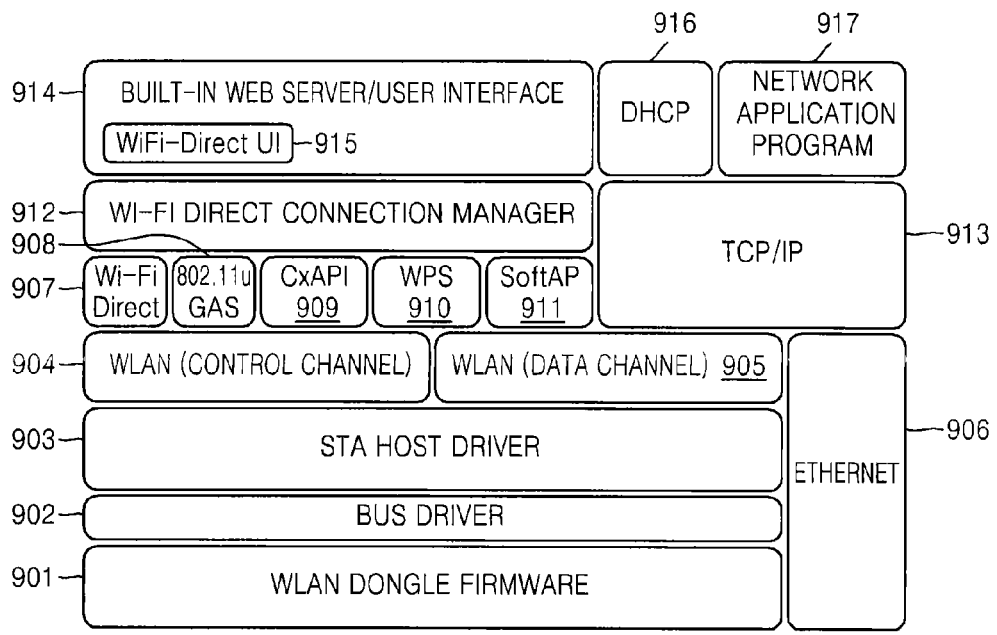
FIG. 9 is a block diagram showing a software configuration of the multi-function printer supporting the Wi-Fi Direct of FIG. 8.

FIG. 9 is a block diagram showing software configuration of the Wi-Fi Direct MFP. The configuration of the software in the Wi-Fi Direct MFP will be described with reference to FIG. 9 as follows.

A WLAN dongle firmware 901 is a firmware for connecting the WLAN, and may be stored in WLAN dongle hardware or may be transmitted to the WLAN dongle hardware from a main board of the MFP when booting the MFP. A bus driver 902 and a station (STA) host driver 903 are low level bus drivers for communicating with the WLAN hardware. A WLAN control channel 904 and a WLAN data channel 905 are channels for communicating with the WLAN firmware. A Wi-Fi Direct module 907 performs the Wi-Fi Direct connection and transmits an operating command to the WLAN firmware. An IEEE 802.11u generic advertisement service (GAS) module 908 performs functions according to IEEE 802.11u GAS, and a WPS module 910 performs a WPS function. A soft AP module 911 is a software module allowing the MFP to perform as the AP. A transmission control protocol (TCP)/IP 913 is a standard protocol for network transmission. A Wi-Fi Direct connection manager 912 is a module for controlling the Wi-Fi Direct connection. A Wi-Fi Direct user interface 915 allows the user to perform settings related to the Wi-Fi Direct, and may be included in a user interface 914 that is installed in an embedded web server (EWS). A DHCP server 916 automatically allocates an IP to the Wi-Fi Direct device that is connected as a client. A network application program 917 performs various application operations relating to the network.

The above-described Wi-Fi Direct technology has the following advantages.

The Wi-Fi Direct device may be connected to other devices whenever and wherever, and thus, has maximum mobility and portability. If a new Wi-Fi Direct device is added, the Wi-Fi Direct device may be directly connected to the new Wi-Fi direct device. In addition, it may be identified whether there is an available device or service before setting the connection to other devices, and thus, the Wi-Fi direct devices may be conveniently used. In addition, the connection may be performed simply and stably by a simple operation, for example, pushing a WPS button, and the connection may be performed with high security functions by using the WPA2 technology.

In addition, the Wi-Fi Direct technology may provide various functions that may not be provided by the conventional WLAN technology.

For example, the device discovery function for searching for peripheral Wi-Fi Direct devices by the device type unit, the service discovery function that may search for services provided by the peripheral Wi-Fi Direct devices, a power management function that may effectively use electric power, the concurrent connection function that may form the P2P connection between the Wi-Fi Direct devices while connecting to the conventional infrastructured network, a function of separating a security domain between the infrastructured network connection and the Wi-Fi Direct connection, and a cross connection function for sharing an Internet connection may be provided by the Wi-Fi Direct technology.

In addition, since the Wi-Fi Direct technology is based on the conventional WLAN technology, that is, IEEE 802.11, the Wi-Fi Direct devices may be compatible with conventional legacy WLAN devices.

Hereinafter, a Wi-Fi Direct MFP and a method of managing an address book of the Wi-Fi Direct MFP, according to an embodiment, will be described in detail with reference to FIGS. 10 through 15.

The Wi-Fi Direct MFP may generate and manage an address book including WLAN devices connected thereto. The wireless devices that may be wirelessly connected to the Wi-Fi Direct MFP and address information thereof are registered in the address book. For example, an address name of a smartphone supporting the Wi-Fi Direct is generated, and the smartphone may be registered in the generated address name in the address book with address information of the smartphone. Here, the address information may include an IP address of the smartphone, a server message block (SMB) address of the smartphone, and a file transfer protocol (FTP) address of the smartphone. The address book may include the address information of the WLAN devices that had been connected to the Wi-Fi Direct MFP and currently connected WLAN devices so as to manage connections to the WLAN devices efficiently. According to the following embodiments, wireless devices connected to the Wi-Fi Direct MFP in the P2P connection type are automatically registered in the address book of the Wi-Fi Direct MFP with the IP addresses allocated to the wireless devices, and address names in which the wireless devices are registered may be automatically generated by using device information of the wireless devices.

Figure 10:
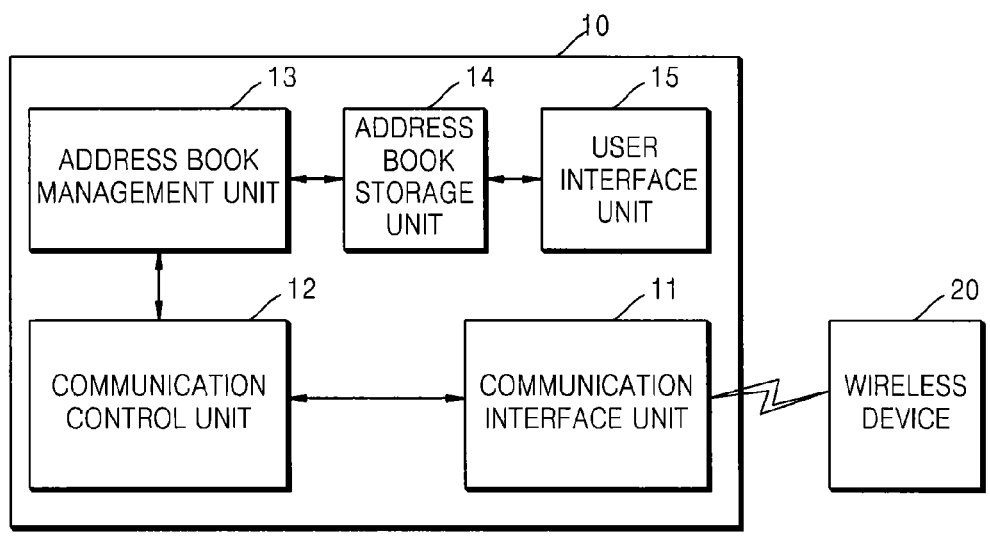
FIG. 10 is a block diagram of a detailed hardware configuration of the multi-function printer supporting the Wi-Fi Direct, shown in FIG. 8.

FIG. 10 is a block diagram of a Wi-Fi Direct MFP 10 according to an embodiment. Featured components, which are necessary in executing the method of managing the address book, of the Wi-Fi Direct MFP 10 are only shown in FIG. 10 under the assumption that the basic hardware configuration of the Wi-Fi Direct MFP shown in FIG. 8 is included in the Wi-Fi Direct MFP 10. For example, a communication interface unit (communication interface) 11 of FIG. 10 corresponds to the WLAN interface unit 810 of FIG. 8, and a communication control unit (communication controller) 12 corresponds to a part for controlling communications in the CPU 830 of FIG. 8. An address book management unit (address book manager) 13 of FIG. 10 corresponds to a portion performing management processes of the address book in the CPU 830 of FIG. 8, an address book storage unit 14 of FIG. 10 corresponds to a space where the address book is stored in the memory unit 840 of FIG. 8, and a user interface unit (user interface) 15 of FIG. 10 corresponds to the user interface unit 850 of FIG. 8. Basic components of the MFP such as the print engine 880, the fax module 870, and the scanner module 860 shown in FIG. 8 are not shown in FIG. 10.

Referring to FIG. 10, the Wi-Fi Direct MFP 10 of an embodiment may include the communication interface unit (communication interface) 11, the communication control unit (communication controller) 12, the address book management unit (address book manager) 13, the address book storage unit 14, and the user interface unit (user interface) 15. Although not shown in FIG. 10, the Wi-Fi Direct MFP 10 of an embodiment may further include a soft AP unit and a DHCP server unit (DHCP server). In addition, the Wi-Fi Direct MFP 10 may be P2P connected to an external wireless device 20 via the communication interface unit (communication interface) 11. Functions and operations of the components in the Wi-Fi Direct MFP 10 will be described in more detail as follows.

Figure 11:
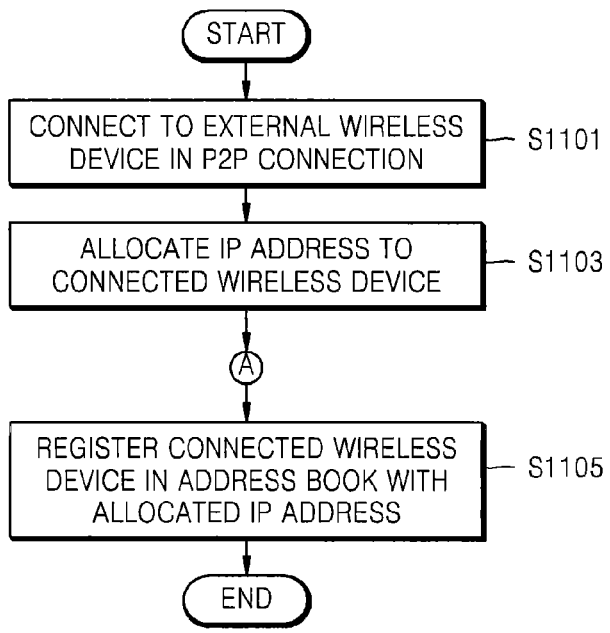
FIG. 11 is a flowchart illustrating a method of managing an address book of a multi-function printer supporting the Wi-Fi Direct, according to an embodiment.

FIG. 11 is a flowchart illustrating a method of managing the address book of the Wi-Fi Direct MFP shown in FIG. 10, according to an embodiment. The method of managing the address book of the Wi-Fi Direct MFP will be described with reference to FIGS. 10 and 11. The Wi-Fi Direct MFP 10 is P2P connected to the external wireless device 20 via the communication interface unit 11 (S1101). If the Wi-Fi Direct MFP 10 and the wireless device 20 both support Bluetooth technology, the Wi-Fi Direct MFP 10 and the wireless device 20 may be P2P connected to each other by using Bluetooth. Otherwise, if the MFP 10 and the wireless device 20 both support the Wi-Fi Direct, one of the Wi-Fi Direct MFP 10 and the wireless device 20 becomes the GO and drives the soft AP unit (not shown) to perform as the AP, and then, the Wi-Fi Direct MFP 10 and the wireless device 20 may be P2P connected to each other. For example, when both of the MFP 10 and the wireless device 20 support the Wi-Fi Direct and the MFP 10 is the GO, the Wi-Fi Direct MFP 10 and the wireless device 20 are P2P connected to each other through the connecting processes shown in FIG. 2. That is, the Wi-Fi Direct MFP 10 searches for peripheral wireless devices and selects the wireless device 20 to be connected among the searched wireless devices, and then, transmits a connection request. Then, through the group formation process shown in FIG. 4, it is determined that the Wi-Fi Direct MFP 10 operates as the GO and the wireless device 20 operates as the client. In addition, WPS buttons provided on the Wi-Fi Direct MFP 10 and the wireless device 20 are pushed in order to execute the WPS, the secure connection is set between the Wi-Fi MFP 10 and the wireless device 20. After that, the communication control unit 12 of the Wi-Fi Direct MFP 10 drives the DHCP server (not shown) to allocate an IP address to the wireless device 20 connected thereto (S1103). When the IP address is allocated to the wireless device 20, the address book management unit 13 of the Wi-Fi Direct MFP 10 stores information of the wireless device 20 in the address book storage unit 14, along with the allocated IP address (S1105). Here, the address name of the wireless device 20 in the address book may be directly input by the user, or may be automatically generated by the address book management unit 13 of the Wi-Fi Direct MFP 10. An example of automatically generating the address name by the address book management unit 13 is shown in FIGS. 12 and 13.

When the Wi-Fi Direct MFP 10 is connected to another wireless device 20, the user executes an application program for transmitting data and transmits the data of the MFP to the wireless device 20 connected thereto through an SMB, an FTP, Web-based distributed authoring and versioning (Web-DAV), or a network technology without an interesting name (TWAIN). At this time, in order to transmit the data, information such as a server IP address of the wireless device 20, log-in information, or a shared folder path is necessary. Conventionally, the user has to directly input device information of the wireless device connected to the MFP in the address book of the MFP. In addition, as described above, the IP address of the wireless device connected to the MFP as the client is automatically generated by the DHCO server and allocated, and the IP address is a temporary address that varies depending on each connection. Therefore, the user has to check the newly generated IP address in the wireless device, and directly input the IP address in the MFP according to the conventional art.

However, according to the method of managing the address book of the Wi-Fi Direct MFP of the present embodiment, the IP address of the wireless device is automatically input into the address book of the Wi-Fi Direct MFP when the wireless device is connected to the Wi-Fi Direct MFP. Therefore, the user does not need to input the IP address in the Wi-Fi Direct MFP.

Figure 12:
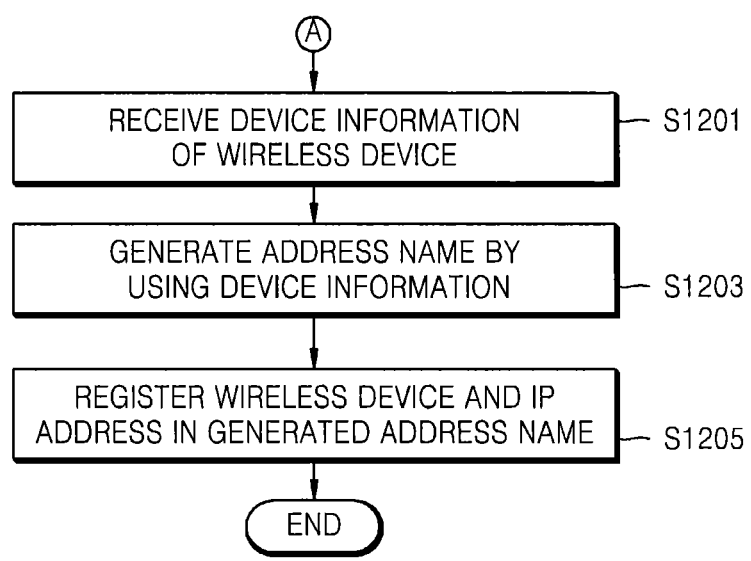
FIG. 12 is a flowchart illustrating detailed processes included in an operation of storing information of a wireless device in an address book storage unit, along with an allocated IP address of FIG. 11.
Figure 13:
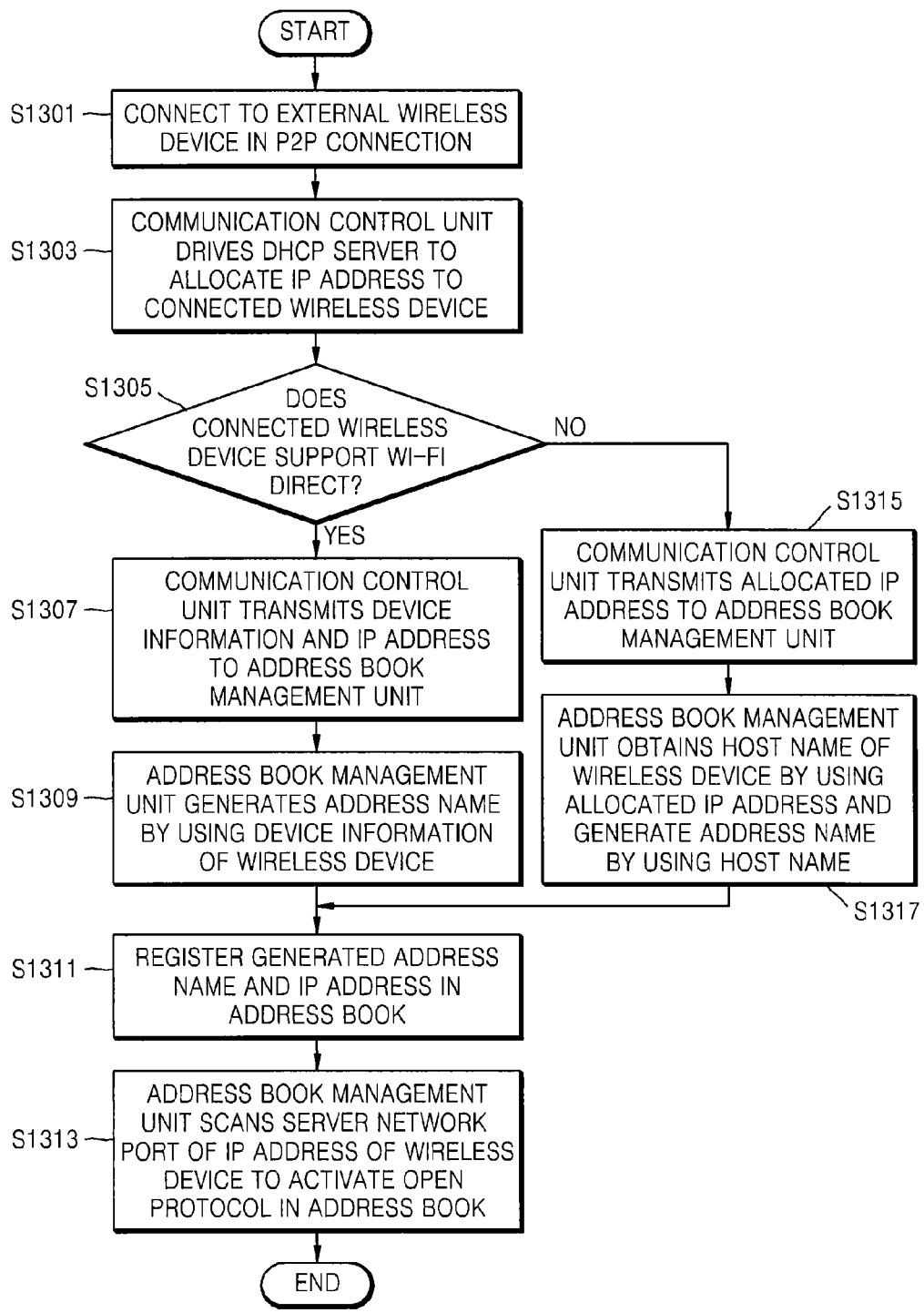
FIG. 13 is a flowchart illustrating a method of managing an address book of a multi-function printer supporting the Wi-Fi Direct, according to an embodiment.

FIG. 12 is a flowchart illustrating sub-processes included in operation S1105 of FIG. 11. FIG. 12 illustrates a method of generating the address name used when registering the wireless device 20 in the address book of the Wi-Fi Direct MFP 10. When the wireless device 20 is connected to the Wi-Fi Direct MFP 10, the communication control unit 12 receives device information of the wireless device 20 (S1201), and transmits the device information to the address book management unit 13. The address book management unit 13 generates the address name for registering the wireless device 20 in the address book by using the transmitted device information of the wireless device 20 (S1203). Then, the address book management unit 13 registers the wireless device 20 and the IP address of the wireless device 20 in the generated address name (S1205). As described above, since the address name is generated by using the device information of the wireless device 20, the user does not need to input the address name, and the wireless device 20 may be automatically registered in the address book.

FIG. 13 is a flowchart illustrating a method of managing an address book of a Wi-Fi Direct MFP according to an embodiment. The wireless device that is P2P connected to the Wi-Fi Direct MFP may be a legacy WLAN device that does not support the Wi-Fi Direct. FIG. 13 illustrates that the address name generating processes may vary depending on whether the wireless device connected to the Wi-Fi Direct MFP supports the Wi-Fi Direct.

When the wireless device 20 is P2P connected to the Wi-Fi Direct MFP 10 (S1301), the communication control unit 12 drives the DHCP server to allocate the IP address to the wireless device 20 (S1303). It is determined whether the wireless device 20 connected to the Wi-Fi Direct MFP 10 supports the Wi-Fi Direct (S1305). Then, if the wireless device 20 supports the Wi-Fi Direct, the communication control unit 12 of the Wi-Fi Direct MFP 10 may obtain the device information of the wireless device 20, for example, the device type, the manufacturer, and the device name of the wireless device 20, through the device discovery process shown in FIG. 3. When the communication control unit 12 transmits the device information and the IP address of the wireless device 20 to the address book management unit 13 (S1307), the address book management unit 13 may generate the address name by using the device information (S1309). For example, if a rule of address name generation is set as "[identifier representing Wi-Fi device]-[manufacturer]-[device type]-[device name]", the address name may be generated as, for example, "WiFi-SAMSUNG-NOTEPC-TEST".

On the other hand, if the wireless device 20 does not support the Wi-Fi Direct, the communication control unit 12 transmits the IP address allocated to the wireless device 20 to the address book management unit 13 (S1315), and the address book management unit 13 obtains a host name of the wireless device 20 by using the IP address and generates the address name by using the host name (S1317). For example, if a rule of address name generation is set as "[identifier representing Wi-Fi device]-[host name]" and the host name of the wireless device 20 is "myNotePC", the address name of the wireless device 20 is "WiFi-myNotePC".

When the generation of the address name in which the wireless device 20 will be registered is finished in operation S1309 or operation S1317, the address book management unit 13 registers the wireless device 20 and the IP address in the generated address name in the address book (S1311). In addition, the address book management unit 13 scans a server network port with respect to the IP address of the wireless device 20 to activate the open protocol in the address book (S1313). The method of scanning the port may be performed by trying to form a TCP connection to each port and checking whether the connection is set or not.

Figure 14:
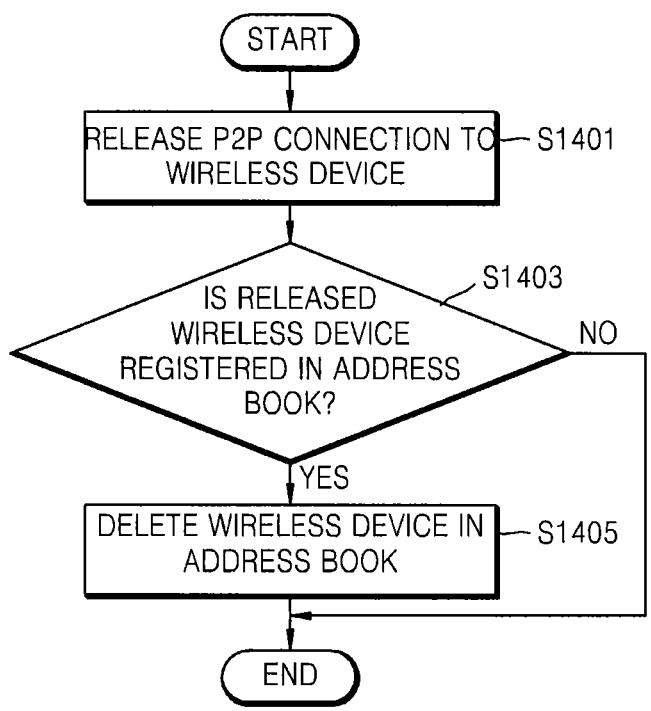
FIG. 14 is a flowchart illustrating processes when a peer-to-peer (P2P) connection between a multi-function printer and a wireless device is disconnected, in the method of managing the address book of the multi-function printer supporting the Wi-Fi Direct, according to an embodiment.

FIG. 14 is a flowchart illustrating a process performed when the P2P connection between the Wi-Fi Direct MFP 10 and the wireless device 20 is disconnected, in the method of managing the address book of the Wi-Fi Direct MFP according to an embodiment. Referring to FIG. 14, when the P2P connection between the Wi-Fi Direct MFP 10 and the wireless device 20 is disconnected (S1401), it is identified whether there is the wireless device 20 is registered in the address book (S1403), and the wireless device 20 may be deleted from the address book (S1405). Otherwise, the address book may represent the wireless device 20, the connection of which is disconnected, without deleting the wireless device 20. Thus, the user may easily identify the wireless devices, to which the Wi-Fi Direct MFP is currently connected, simply by using the address book.

Figure 15:
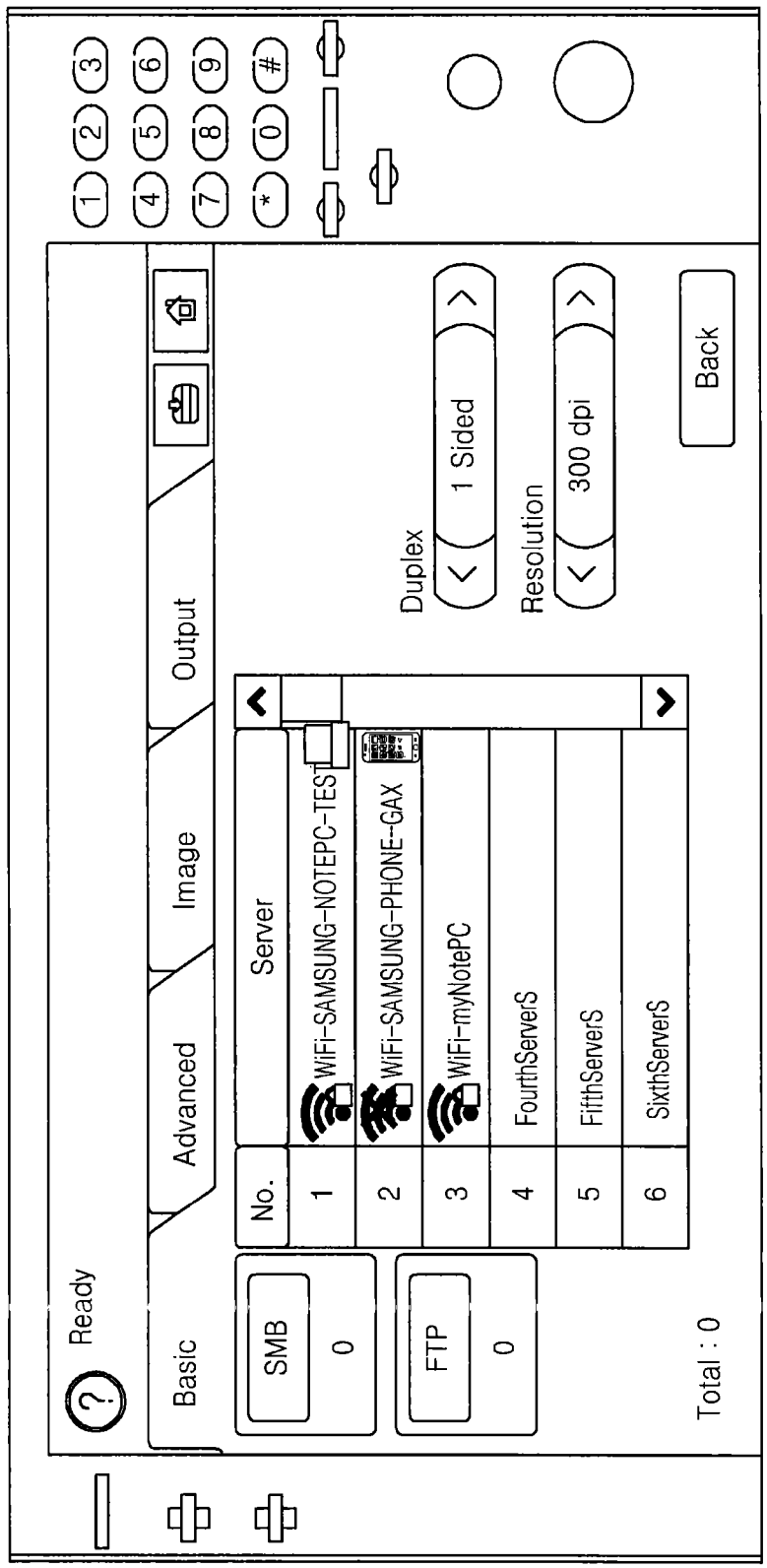
FIG. 15 is a diagram showing a user interface screen of an address book in the multi-function printer supporting the Wi-Fi Direct, according to an embodiment.

On the other hand, when the wireless device 20 is registered in the address book, the device information of the wireless device 20 such as the device type and the connecting states of the wireless device 20 may be represented to the user by using graphic icons via the user interface. FIG. 15 shows an example of the user interface screen of the address book. Referring to FIG. 15, a list of the wireless devices registered in the address book is displayed, information such as the device type and the manufacturer is displayed in text and the graphic icons, and the connecting states of the wireless devices are shown in graphics.

According to one or more embodiments, the IP address is allocated to the wireless device that is P2P connected to the image forming apparatus, and the wireless device is automatically registered with the allocated IP address. Thus, the IP address may be used without operations having to be performed by the user.

In addition, the address name, in which the wireless device is registered, in the address book, is generated by using the device information of the wireless device, and thus, the address book may be generated automatically.

Embodiments may be recorded in computer-readable media including program instructions (computer readable instructions) to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

While embodiments have been particularly shown and described with reference to drawings, it will be understood by those of ordinary skill in the art that various changes in form and details may be made therein without departing from the spirit and scope of the disclosure as defined by the following claims.

What is claimed is:

1. A method of managing an address book of an image forming apparatus that supports a peer to peer (P2P) connection, the method comprising:

connecting the image forming apparatus to an external wireless device in a P2P connection method through a wireless local area network (WLAN);

operating a soft access point (AP) module of the image forming apparatus so that the image forming apparatus operates as an AP;

allocating an internet protocol (IP) address to the wireless device by driving a dynamic host configuration protocol (DHCP) server module of the image forming apparatus; and registering the wireless device connected to the image forming apparatus in the address book, which stores information about wireless devices that are connectable to the image forming apparatus, along with the allocated IP address, wherein the address book provides a list of wireless devices to a user and if the user selects a wireless device in the address book, the image forming apparatus transmits data to the selected wireless device.

2. The method of claim 1, wherein the image forming apparatus operates as the AP that allows clients on a WLAN to be connected to each other or operates as a client on the WLAN, and the allocating of the IP address is performed when the image forming apparatus operates as the AP.

3. The method of claim 1, wherein the registering of the wireless device in the address book comprises:

receiving device information of the connected wireless device; and generating an address name, in which the wireless device is registered, by using the device information.

4. The method of claim 3, wherein the device information includes at least one selected from the group consisting of a device type of the wireless device, a manufacturer of the wireless device, a device name, and a host name of the wireless device.

5. The method of claim 4, further comprising representing the device type of the wireless device registered in the address book on a screen on which the address book is displayed by using text or graphics.

6. The method of claim 1, further comprising representing a connecting status of the wireless device that is registered in the address book, on the screen on which the address book is displayed.

7. The method of claim 1, further comprising:

determining whether the connection between the wireless device and the image forming apparatus is maintained; and updating the address book when it is determined that the wireless device is disconnected.

8. The method of claim 7, wherein the updating of the address book comprises deleting the wireless device from the address book.

9. The method of claim 7, wherein the updating of the address book comprises representing that the wireless device is disconnected on the screen on which the address book is displayed.

10. The method of claim 1, further comprising:

scanning a network port of the wireless device;

determining a protocol supported by the wireless device as a result of the scanning; and activating the protocol supported by the wireless device in the address book.

11. At least one non-transitory computer readable recording medium storing computer readable instructions that control at least one processor for executing the method according to claim 1.

12. An image forming apparatus supporting a peer to peer (P2P) connection, the image forming apparatus comprising:
- a communication interface unit which is connected to an external wireless device in a P2P connection method when the image forming apparatus performs as an access point (AP) by driving a soft AP module;
- a communication control unit which allocates an internet protocol (IP) address to the wireless device connected to the image forming apparatus through the communication interface unit, by driving a dynamic host configuration protocol (DHCP) server module;
- an address book management unit which registers the wireless device connected to the image forming apparatus in an address book, in which wireless devices that are connectable to the image forming apparatus are registered, along with the allocated IP address; and
- an address book storage unit which stores the address book, wherein the address book provides a list of wireless devices to a user and if the user selects a wireless device in the address book, the image forming apparatus transmits data to the selected wireless device.

13. The image forming apparatus of claim 12, wherein the image forming apparatus operates as the AP that allows clients on a wireless local area network (WLAN) to be connected to each other or operates as a client on the WLAN, and the communication control unit allocates the IP address to the wireless device when the image forming apparatus operates as the AP.

14. The image forming apparatus of claim 12, wherein the communication control unit receives device information of the wireless device connected to the image forming apparatus to transmit the device information to the address book management unit, and the address book management unit generates an address book, in which the wireless device is registered, by using the device information.

15. The image forming apparatus of claim 14, wherein the device information includes at least one selected from the group consisting of a device type of the wireless device, a manufacturer of the wireless device, a device name, and a host name of the wireless device.

16. The image forming apparatus of claim 15, further comprising a user interface unit which displays information about the address book to a user of the image forming apparatus, wherein the user interface displays the device type of the wireless device registered in the address book as text or graphics.

17. The image forming apparatus of claim 12, further comprising a user interface unit which displays information about the address book to the user, wherein the user interface displays a connecting status of the wireless device registered in the address book.

18. The image forming apparatus of claim 12, wherein when the wireless device and the image forming apparatus are disconnected, the communication control unit notifies the address book management unit of the disconnection, and the address book management unit updates the address book stored in the address book storage unit.

19. The image forming apparatus of claim 18, wherein the address book management unit deletes the disconnected wireless device from the address book.

20. The image forming apparatus of claim 18, wherein the address book management unit displays that the wireless device is disconnected in the address book.

21. The image forming apparatus of claim 12, wherein the address book management unit scans of a network port of the wireless device to search for a protocol supported by the wireless device, and activates the searched protocol.

* * * * *